United States Patent [19]

Jeanneret

[11] Patent Number: 5,087,189
[45] Date of Patent: Feb. 11, 1992

[54] SYSTEM FOR SYNCHRONIZING THE TRAVEL AND FILLING OF CAVITIES OF A MOLD

[75] Inventor: Rolando Jeanneret, Vina del Mar, Chile

[73] Assignee: Comerical e Industrial Ausonia Ltda., Vina del Mar, Chile

[21] Appl. No.: 582,064

[22] Filed: Sep. 14, 1990

[30] Foreign Application Priority Data

Jul. 6, 1990 [AR] Argentina .................. 317.322

[51] Int. Cl.$^5$ .............................. B29C 31/00
[52] U.S. Cl. ...................... 425/145; 425/150; 425/159
[58] Field of Search ............... 425/145, 150, 159, 171

[56] References Cited

U.S. PATENT DOCUMENTS

| | | | |
|---|---|---|---|
| 3,833,693 | 9/1974 | Ross | 425/145 |
| 4,462,952 | 7/1984 | Hautemont | 425/150 |
| 4,747,766 | 5/1988 | Van Meulenbeke | 425/159 |
| 4,950,145 | 8/1990 | Zanetos et al. | 425/145 |

Primary Examiner—Jay H. Woo
Assistant Examiner—C. Scott Bushey

[57] ABSTRACT

An apparatus for synchronizing the movement and filling of chocolate molds. A threaded bar or screw is provided with disks that are displaced therealong so as to correspond to distances between cavities of the mold. An inductive sensor mounted to the rod of the mold pushing cylinder delivers a signal to a logical programmable controller which prompts the movement of the pushing cylinder to be ceased and the valve of a chocolate hopper to be opened so as to properly locate and fill the cavities of the mold. The chocolate discharging valve is closed by the controlled system following a predetermined fill time and the pushing cylinder is again activated to move the mold until the sensor detects a next adjacent disk indicating that the nozzle of the hopper is disposed above the next cavity of the mold, so that the filling cycle can be repeated.

7 Claims, 1 Drawing Sheet

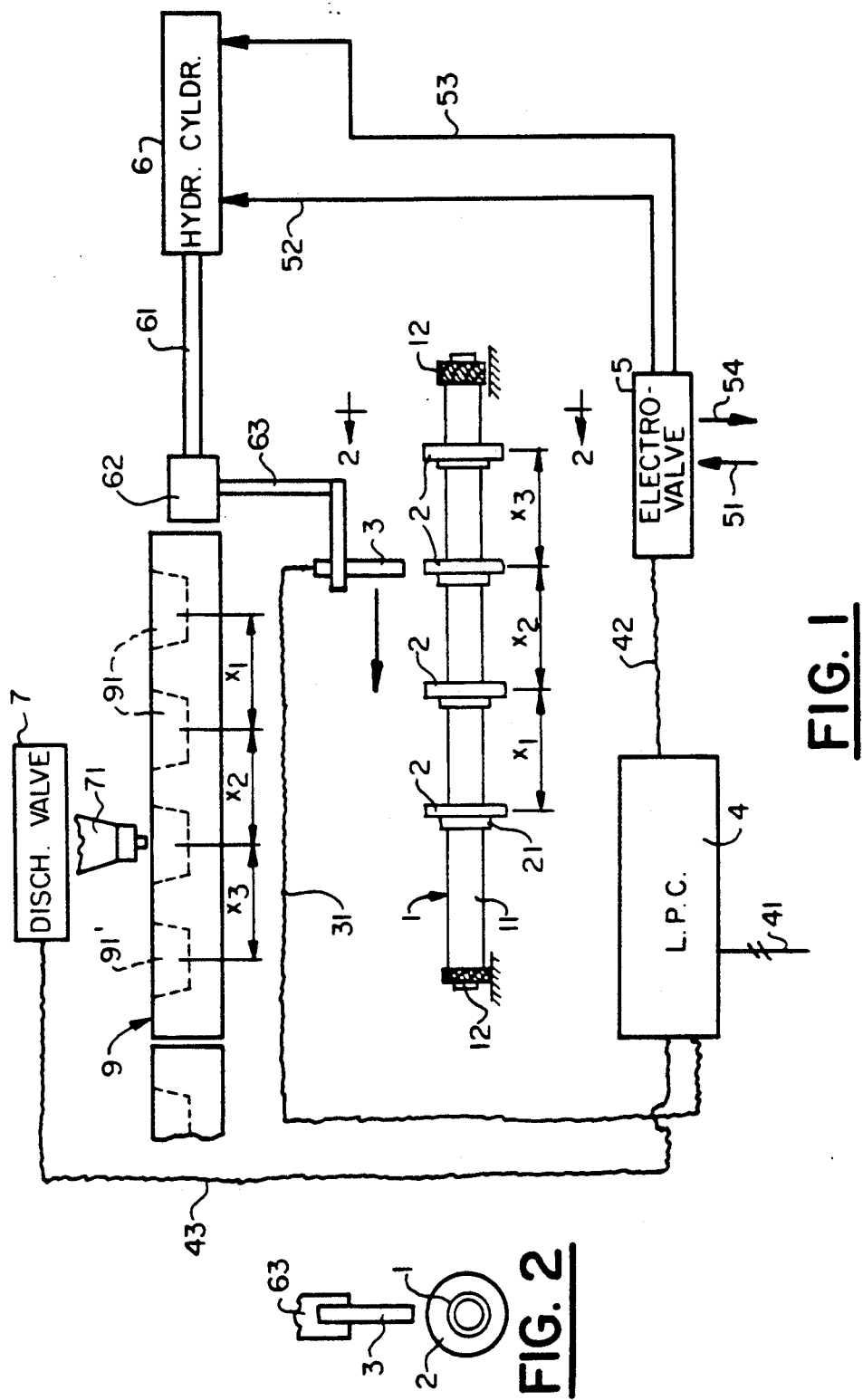

SYSTEM FOR SYNCHRONIZING THE TRAVEL AND FILLING OF CAVITIES OF A MOLD

BACKGROUND OF THE INVENTION

1. Field of the Invention

The present invention relates to forming chocolate candies and, more particularly, to a system for synchronizing the travel and filling of chocolate molds which ensures the proper residence and positioning of the empty molds under depositing hoppers.

2. Description of the Related Art

In every chocolate forming process, whether solid drops or filled candy, molds are used that present a plurality of cavities in which the chocolate delivered by depositing hoppers is received.

The exact positioning of the molds under the nozzles of the hoppers is critical to the forming process as it must be ensured that the liquid chocolate falls into the mold cavities and not elsewhere.

Currently, to move molds and stop the same under dosage nozzles, one of several systems is employed. For example, the dragging chain system may be used. In this system, a dragging chain moves the entire line of molds at the chocolate forming plant. Mold-carrying frames for holding each mold are attached to each of the links of the chain. The pitch or travel sequence of the system is determined by gears and cams which cause the molds to advance by the exact distance for them to properly come under the dosage nozzles.

Another system uses the conveyor belt. In this system, the molds are disposed on a dragging belt and the belt is constantly in motion. Positioning cams allow or stop the advance of the molds to locate the same under dosage nozzles.

A third system is the fixed surface system. With this system, molds are pushed on a smooth, fixed surface of a bench or forming table using a pneumatic or hydraulic cylinder which is located at one end of the line of molds. Movement of the mold is effected by the extension of the cylinder. When the cylinder retracts, the molds come to a stop and a new mold can be introduced between the last mold and the pushing cylinder.

The above-mentioned systems present a certain number of disadvantages. For example, the dragging chain system is expensive and difficult to maintain and lubricate. Further, it is difficult to keep that system clean. In addition, the mold carrying frame is not flexible enough for molds to be changed and only molds with the same perimeter as the mold-carrying frame can be used. Finally, all the displacement sequences between cavities must be identical.

The conveyor belt system is more flexible than the chain and mold carrier system as the travel pitch is regulated by cam shafts and/or gears. However, because the conveyor belt is in constant motion, displacement of the entire mold is necessary until a stop means is encountered. Thus a partial or controlled displacement of the mold is not possible with that system. Furthermore, the conveyor belts are easily smeared with spilled chocolate.

Although the fixed surface system is a simpler system in terms of its function because of easy maintenance and cleanliness, flexibility in terms of mold formats used, and because molds may be displaced according to how the travel sequence has been scheduled, the control of the motion of molds requires a processor and a system of sensors of the analog or on-off type. At present, such processors are very expensive and changes in format, are not usually achieved and are unreliable due to the high electronic sophistication involved.

SUMMARY OF THE INVENTION

It is an object of this invention to provide a synchronizing system to regulate and control the travel and residence of chocolate molds which operates on a fixed surface ensuring an exact regulation of the place of where the molds are halted, is simple to operate and adjust and allows different sequences or advance distances in a series of molds.

In addition, the synchronizing system of the invention is simple, uses electronic circuits of low sophistication and is of low cost and easy maintenance, being sufficient to modify and/or improve existing chocolate forming machines.

In accordance with the system of the invention, the regulation of displacement or pitch of the molds is defined by the location and relative position of at least two position indicating rings which are located along a rod disposed in parallel to the path of travel of the mold. Of course there may be more than two position indicating rings and preferably there are as many rings as cavities in a particular mold plate.

A sensor, preferably of the inductive type that moves in synchrony with the movement of the molds' pushing piston, provides a signal to an LPC (logical programmable controller) which controls an electrovalve that operates the pushing piston. Conveniently, a signal from the LPC can open and close the discharge of the depositing hopper when the cavities of the mold are properly disposed under the filling nozzle(s).

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various FIGURES.

BRIEF DESCRIPTION OF THE DRAWINGS

FIG. 1 is a schematic diagram which shows the arrangement of the elements of the system provided in accordance with the invention; and FIG. 2 is an end view, in section, taken along line 2—2 of FIG. 1.

DETAILED DESCRIPTION OF THE PRESENTLY PREFERRED EXEMPLARY EMBODIMENT

The synchronizing system in accordance with the invention includes a threaded bar 1 which is fixedly mounted to supports 12 which are shown schematically in FIG. 1 and arranged so that the longitudinal axis of bar 1 is disposed in parallel to the path of travel of the molds. A surface of bar 1 is threaded with a very fine pitch along its entire length as will become more apparent below.

Disks 2 which have a relative small diameter and thickness are threadably mounted to bar 1. Preferably, disks 2 have a hub 21 including a locking means such as for example a set screw (not shown) to fix the same in position.

A hydraulic cylinder 6 having a rod 61 is mounted to the fixed surface of the forming table so that the axis of rod 61 is aligned with the travel axis of the molds. A mounting device 62 is coupled to the end of rod 61 and may serve as a pushing head for the molds. An arm 63 is fixedly mounted to mounting device 62 and has a sensor 3, for example of the inductive type, which is moved as rod 61 is moved along the longitudinal axis of threaded bar 1.

A conductive cable 31 connects inductive sensor 3 to the input of a conventional logical programmable controller (LPC) 4 which is electrically fed, for example with 24 V.C.C. through a line 41. An outlet of the LPC is connected by a line 42 to a directional electrovalve 5 which receives hydraulic fluid through line 51 from a source of hydraulic fluid (not shown) and returns hydraulic fluid to that source via line 54. Electrovalve 5 is hydraulically connected to cylinder 6 by means of lines 52 and 53 as shown in FIG. 1.

A second outlet of the LPC 4 is connected, for example through a line 43, to a discharge valve 7 of a chocolate dosing hopper (not shown) which has a discharge nozzle 71.

In operation, distances between disks 2 which are successively arranged on threaded bar 1, indicated by X1, X2, X3, are adjusted by rotating the disks to increase or decrease the distances between one another until those distances correspond exactly to the distances existing between the cavities 91 of mold 9.

The operation of the system of the invention is very simple and is as follows:

The position of the disk adjacent to the right end of threaded bar 1 (FIG. 1) is adjusted so that its respective cavity 91 (left side of mold) will be located exactly under nozzle 71 of the chocolate dosing hopper when sensor 3 senses that right hand disk. Then the distance between successive disks 2 along threaded bar 1 is adjusted to correspond to the distance or pitch between mold cavities 91 of mold 9. When sensor 3 senses a disk, movement of rod 61 is ceased, as described below, and sensor 3 sends an input signal to LPC 4 which in turn sends an opening signal to discharge valve 7 to pour the chocolate into the cavity 91 of mold 9. At the end of chocolate pouring, the timing of which is regulated by the LPC 4, the LPC sends a closing signal to valve 7 and an opening signal to electrovalve 5. This in turn allows passage of hydraulic fluid through line 53 towards cylinder 6 which will begin to extend rod 61 until sensor 3 is disposed adjacent to the second disk 2. At this point, the signal sent by sensor 3 to LPC 4 results in a closing signal to electrovalve 5 for closing the passage of hydraulic fluid to cylinder 6 and hence travel of rod 61 is ceased so that the second cavity of the mold is positioned under nozzle 71. The LPC 4 then sends an opening signal to the discharge valve 7 so that the second cavity of the mold will be filled with chocolate. The sequence is repeated until the last cavity of the mold has been filled with chocolate.

Proper programming of the LPC 4 causes a change signal to be sent to electrovalve 5 to send hydraulic fluid to cylinder 6 via line 52 so that the rod is retracted and returns to its initial position in order to accept a new empty mold and to reinitiate the filling cycle for the next mold.

As is apparent from the foregoing, the system of the invention is a low cost, easy to adjust and maintain system which provides great accuracy in positioning the mold cavities under the dosing nozzle. Furthermore, as many disks 2 as required can be provided on threaded bar 1 to accommodate the mold under the dosing nozzle. Setting of each disk is independent and therefore one can easily obtain different displacements for each chocolate discharge for a giving mold. The simplicity of the inventive system completely eliminates mechanical parts that require adjustment and maintenance. Further, the system as described, lacks mechanical elements that may suffer wear and tear as the inductive sensor acts by proximity and not by contact to control the movement of the pushing cylinder.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for synchronizing the travel and filling of cavities of a mold which is moved along a fixed surface of a forming machine, wherein a cylinder is provided for displacing the mold, comprising:
   a fixed surface;
   means fixedly mounted to said fixed surface and having means for urging at least one mold to move along a path of travel on said fixed surface;
   at least one mold material hopper mounted vertically above said fixed surface for delivering mold material to said at least one mold;
   a bar element having first and second longitudinal ends and a longitudinal axis, said bar element being mounted with respect to said fixed surface so that said longitudinal axis of said bar element is disposed substantially parallel to said path of travel;
   at least two disk elements mounted to said bar element so as to be selectively movable along said longitudinal axis of said bar element;
   a sensor element fixedly coupled to said means for urging so as to move therewith in parallel to and in close proximity to said disks on said bar element;
   control means operatively coupled to said sensor for receiving a signal when said sensor is disposed immediately adjacent one of said disks, said control means being operatively coupled to said mean for urging and being operatively coupled to said mold material hopper so as to cease movement of said means for urging and to allow flow of material from said hopper to at least one cavity of said mold when said sensor is aligned with a said disk.

2. An apparatus as in claim 1, wherein said control means is further operative to cease flow from said hopper after a predetermined period of time and to then actuate said means for urging so that motion thereof is resumed.

3. An apparatus as in claim 1, wherein said disks are threadedbly mounted to said bar element and are movable longitudinally of said bar element by rotating the disks.

4. An apparatus as in claim 1, further comprising means for locking said disks relative to said bar element.

5. An apparatus as in claim 1, further comprising a directional electrovalve for conveying hydraulic fluid to said means for urging, said control means controlling operation of said electrovalve.

6. An apparatus as in claim 1, wherein said longitudinal ends of said bar element are fixedly mounted with respect to said fixed surface.

7. An apparatus as in claim 1, wherein each said mold comprises a plurality of mold cavities along the length thereof, a said disk being mounted to said bar element for each said mold cavity.

* * * * *